(12) United States Patent
Osborne et al.

(10) Patent No.: US 6,589,055 B2
(45) Date of Patent: Jul. 8, 2003

(54) INTERACTIVE EMPLOYEE TRAINING SYSTEM AND METHOD

(75) Inventors: Patrick J. Osborne, Davidson, MD (US); James Martin, Marshall, VA (US)

(73) Assignee: American Association of Airport Executives, Alexandria, VA (US)

( * ) Notice: Subject to any disclaimer, the term of this patent is extended or adjusted under 35 U.S.C. 154(b) by 30 days.

(21) Appl. No.: 09/777,907

(22) Filed: Feb. 7, 2001

(65) Prior Publication Data

US 2002/0106622 A1 Aug. 8, 2002

(51) Int. Cl.[7] .............................................. G09B 11/00
(52) U.S. Cl. ........................ 434/219; 434/350; 434/362
(58) Field of Search ............................... 434/322, 323, 434/350, 118, 262, 219, 362

(56) References Cited

U.S. PATENT DOCUMENTS

| | | | | |
|---|---|---|---|---|
| 6,033,226 A | * | 3/2000 | Bullen | 434/219 |
| 6,064,856 A | * | 5/2000 | Lee et al. | 434/350 |
| 6,157,808 A | * | 12/2000 | Hollingsworth | 434/350 |
| 6,213,780 B1 | * | 4/2001 | Ho et al. | 434/219 |
| 6,224,385 B1 | * | 5/2001 | Nitta et al. | 434/219 |
| 6,325,631 B1 | * | 12/2001 | Kouba et al. | 434/219 |
| 6,341,212 B1 | * | 1/2002 | Shende et al. | 434/350 |

* cited by examiner

*Primary Examiner*—Joe H. Cheng
*Assistant Examiner*—Kathleen Christman
(74) *Attorney, Agent, or Firm*—Hogan & Hartson, LLP

(57) ABSTRACT

The disclosed system and method for computer aided training and certification employs a central network for storing certification information and a plurality of training units. In preferred embodiments, the training units are individual systems comprising training software running on a turn-key based personal computer. An advantage of the invention is that the software is completely customized on each training unit to provide instruction using customized multi-media content, such as high quality digital video footage, taken of the trainee's specific job tasks and work site, as well as questions and instructional scripts customized for the job tasks and work site.

20 Claims, 9 Drawing Sheets

INTERACTIVE EMPLOYEE TRAINING SYSTEM AND METHOD

FIELD OF THE INVENTION

The present invention relates to the field of interactive electronic methods and systems for the training and certification of employees. More particularly, the present invention relates to methods and systems for interactive computer-aided training and certification that utilize multimedia content to provide instruction to and obtain feedback from a plurality of trainees via a computer network.

BACKGROUND OF THE INVENTION

Companies and organizations in various industries are required, whether it be by law or by sound business practice, to provide training on a regular basis to their employees regarding safe, efficient, or otherwise necessary procedures for performing their job tasks. In particular, local and federal government agencies often require employers in certain fields to not only provide particular types of periodic training to employees who perform certain tasks, but also require those employers to certify on a regular basis that each such employee has received the training and has demonstrated a minimum understanding of the training materials. For example, the Federal Aviation Administration ("FAA") requires airlines and/or airports to provide periodic safety and security procedures training to employees that perform certain tasks (e.g., airport operations personnel, airline ramp workers, fuel truck operators, etc.) to help ensure that federal aviation protocols are followed. Additionally, the federal Occupational Safety and Health Administration ("OSHA") requires employers in certain high risk industries (such as the construction and chemical manufacturing industries) to regularly certify that employees in various positions have the requisite understanding of any applicable safety regulations. Similarly, there are various state and local jurisdictions that impose like requirements upon various other occupational fields.

Traditionally, companies and organizations provided such occupation specific training and certification functions to their employees by sponsoring classroom-like instruction for their employees. In such cases, a professional instructor is hired to teach trainees (or employees who are seeking periodic re-certification) the required site-specific or task-specific subject matter in a traditional classroom environment. At the end of the "class," the trainees typically are administered a test to judge whether they had mastered the necessary minimum materials required for certification or job approval.

In the art of employee training and certification, a variety of approaches have been taken to remove the need for live instructors and thus automate the training of employee personnel in the work environment. A common approach comprises using one or more books to introduce training material to a trainee, after which the trainee is subjected to a certification test requiring he or she to answer multiple-choice questions about the material. Often, after the certification test is over, a page reference is provided for the reader to review his answer, whether correct or incorrect. If correct, he or she then is instructed to continue with more new material. If incorrect, reference is made to an explanation and the reader is asked to again select the correct answer to the multiple choice question.

Using such take home book classes provides added flexibility in that employees can take training classes and receive certifications as needed. Additionally, self-taught classes eliminate the need to hire and coordinate class attendance with skilled instructors. However, such self-taught book classes suffer the significant disadvantage that trainees are deprived beneficial interaction during the training process. Additionally, book courses also suffer from an inability to clearly convey certain subject matter, such as applications of the material to real-life situations often encountered on the job.

Currently, various systems and methods for computer-aided training and certification are also known. While a great deal of interest has arisen in this field recently due to the emergence of computers into everyday life, and especially into the workplace and classroom, an optimal computer-aided training and certification solution still has not been provided. Computer delivered training systems can take advantage of interactive logic and multi-media content, such as audio or video clips, to provide a better alternative than book-based training, but the current utilized approaches have significant drawbacks that relegate computer-based automated training to the status of an unacceptable alternative for traditional classroom instruction.

U.S. Pat. No. 4,609,358 issued to Sangster et al. teaches a computer system for providing video-based training to trainees. The system uses a video monitor and a network of computers to instruct a plurality of trainees at a given time by accessing and displaying appropriate video content stored on a video disk. The patent alleges that its system is useful in providing training to employees at their work sites and in allowing multiple trainees to interact with one another as they would during related real-life situations.

U.S. Pat. No. 4,360,345 issued to Hon teaches a system in which a computer is used to monitor physical actions performed by a trainee and then provide appropriate feedback, in the form of audio or video clips, to the trainee. The audio/video clips contain instruction relating to the correct manner of performing a given task that the trainee is attempting to master. In response to the trainee's performance on the test actions, the system then selects and displays audio and/or video clips that are expected to further explain skills that the tested trainee has not sufficiently mastered.

U.S. Pat. No. 5,616,033 issued to Kerwin discloses a computer-aided training system that allows administrators to select instructional materials, in the form of generalized hypothetical situations and simulations, that are applicable to a given trainee's particular type of job.

U.S. Pat. No. 6,149,438, to Richard et al., discloses a network system for computer aided instruction wherein a network of computers provide instruction to students by accessing a central library of content stored on a remote mainframe server. Such mainframe systems traditionally run special courseware programs on the students' remote workstations to access information from the server and display the information on the device.

U.S. Pat. No. 4,820,167 issued to Nobles et al. and U.S. Pat. No. 6,162,060 issued to Richard et al. disclose distributed computer systems for providing learning materials to students, testing students, and managing test scores. In both systems, a plurality of computing devices administer tests to the students and then transfer test scores to a central location for storage and administration by proper officials.

Although the foregoing disclosures present a variety of approaches for presenting automated training materials to employees and then checking their responses, they do not provide sufficient opportunity for a trainee to interact with instructional material customized to provide both task-specific and site-specific training information relating to the trainee's job type and work site, respectively. Similarly, the prior approaches have not provided a system that adequately provides training to employees and tracks and manages certification results over both local networks and over distributed networks such as the Internet.

Thus, there remains a need in the art for an improved system and method for computer-aided training and certification that overcomes the above-described and other disadvantages inherent in the prior art.

SUMMARY OF THE INVENTION

Accordingly, the present invention is an improvement over the prior art systems and methods for the training and certification of employees for work environments that require both task-specific and site-specific training.

In light of the above-described and other disadvantages inherent in the prior art, it is an object of the present invention to provide a system and method for training and certification that not only serves as a suitable automated alternative to classroom type training, but also provides a mechanism for simultaneously managing the certification status of many employees.

Further, it is an object of the present invention to provide an interactive computer-based system through which trainees can receive site-specific and task-specific instructional content such that an employee can be easily and competently trained and certified to work in a particular job or activity category and work site environment for performing such a job or activity. Concurrently, it is an object of the present invention to provide such systems and methods whereby trainees can additionally receive such site-specific and task or activity-specific training in the form of interactive multimedia instructional content delivered on an individual basis via stand-alone computer workstations.

Additionally, it is an object of the present invention to provide a system and method for managing the current status of employee certifications at various work sites wherein the records of each employee pertaining to one or more certifications is stored in a centralized data bank.

Finally, it is an object of the present invention to provide a stand alone turn-key computerized unit for conveying customized interactive training instruction to a trainee, and for then testing the trainee to determine if an acceptable portion of the instruction was understood and retained to qualify for certification.

To achieve these and other objects, the disclosed systems for computer aided training and certification according to the present invention include a central network having an electronically accessible storage media, a server, and software run by the server. The system further includes one or more remote client devices (such as personal computers or workstations) that serve as automated training and certification testing units which are electronically connected to the central network. The software running on the central network server is adapted to receive the certification results for employees electronically from the training units, and then store those results on the storage media. Additionally, the server software accepts queries from certification administrators requesting electronic access to the certification results data. Preferably, the central network is electronically acessible by the training units and the certification administrators, such as via the Internet, to facilitate updating of and access to the certification results.

The training units according to the invention each include a visual display, a computer central processing unit, and input means for data entry by a trainee into the unit. In embodiments of the present invention, customized electronic training units are provided to work sites, such as manufacturing plants, R&D facilities and airports, that conduct periodic training and certification of its employees. A series of such training units are adapted to provide instruction to employees/trainees on an individual basis, test the employees regarding the instruction, and upload relevant information pertaining to the certification into a centralized searchable database located on the central network's storage media.

Preferably, each training unit according to the present invention interacts with one trainee at a time, and comprises a stand alone turn-key system including a personal computer with the training software installed therein, a touch screen monitor, and means for outputting audio (such as speakers or headphones). The trainee is provided instruction with multi-media content, such as video clips, that provide training information specifically pertaining to the job for which the trainee requires certification as well as information specifically pertaining to the particular trainee's potential work site (i.e., containing video shots of his particular R&D facility). After each section of instruction (e.g., a series of video clips), the system prompts the user to answer several test questions regarding the previous instruction (video clips). The subject matter and order of these questions, as with the instructional content, are preferably customizable for each facility and each type of job certification in the facility. A training session is complete only once the trainee reviews all of the sections of instructional content and answers the requisite number of test questions. Preferably, the instructional content on each unit includes multi-media material specific to each job type and work site, including video and audio clips of the tasks and specific work environment (job site and/or facility) for which the employee seeks certification.

The interactive system can optionally provide various degrees of customization for each facility and job or activity certification type within the facility. For example, the training units for each facility are designed to show video clips of the particular facility at which the trainee will be working such that the particular nuances and requirements of each facility can be easily explained and understood. Furthermore, the order and content of the video clips and their accompanying audio explanations are customizable to each facility. Additionally, the manner in which the testing is done can be modified for each facility. For example, a passing score for a training and certification session could be based on getting a percentage of questions correct for all sections, or a minimum number of questions correct for each section. Finally, if the minimum number of questions is not answered correctly after each section, then appropriate content, such as a specific video clip, could be automatically replayed and the questions regenerated until the trainee passes the section.

At the end of the training and certification sessions, relevant results information is loaded into a central database (preferably accessible via the Internet) such that the current certification status (name, date last certified, etc.) can be searched and monitored. In this manner, the training and certification responsibilities for a large organization can be more easily administered.

The systems and methods according to the present invention will be discussed in more detail below with respect to the drawings and description of several embodiments of the present invention. It should be understood that the forthcoming description is merely illustrative and is by no means limitative of the invention as claimed.

DETAILED DESCRIPTION OF THE INVENTION

The methods and systems according to the present invention will now be disclosed with reference to the figures. The specific embodiments hereafter disclosed are examples intended to merely demonstrate the operation of the present invention and not to limit the scope of the invention in any way. Those skilled in the art will recognize that changes can be made to the embodiments herein disclosed while still staying within the scope of the present invention.

Figure 1:
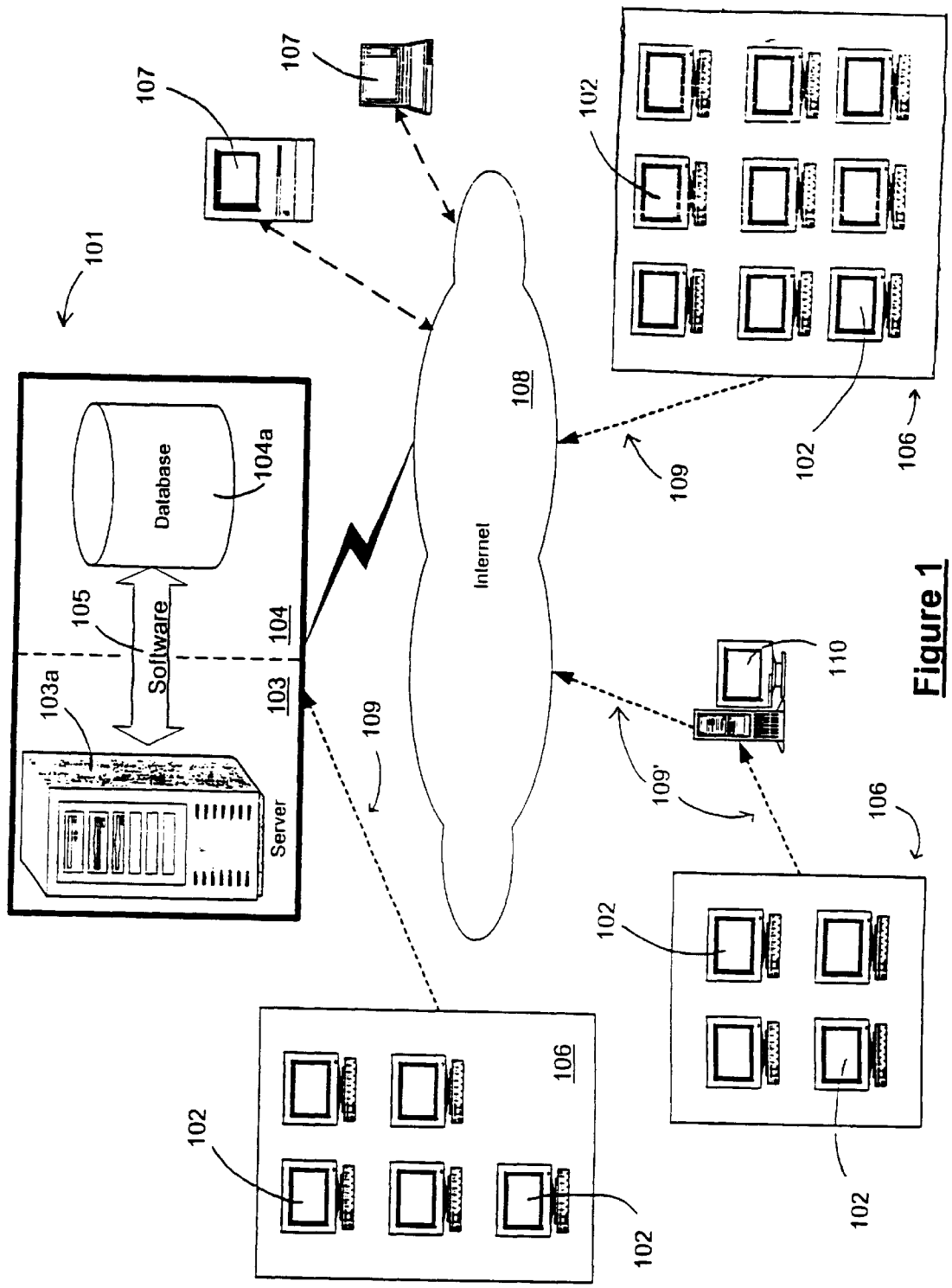
FIG. 1 is a schematic diagram depicting the relative location and interaction of training locations, training and certification units, and the central management network according to embodiments of the present invention.

Referring to FIG. 1, there is a schematic diagram depicting the relative location and interaction of individual automated training and certification testing units 102, and the central management network 101 according to embodiments of the present invention. The central management network comprises a server system 103 and a storage media system 104 that interact through serving software 105.

As shown in the figure, the automated training and certification testing units 102, are preferably arranged into groupings at training centers 106. These groupings characteristically correspond to a plurality of similar training units that are customized for particular organizations or companies, or alternatively for a set of work-sites or job-types. In practice, for example, all employees working at a particular airport, irrespective of their job-type and irrespective of whether they be employed by the same or different airline or by the airport itself, could receive their training and certification testing at a single work-site training center. Alternatively, of course, a training center 106 can correspond to a single employer or organization, or even more specifically, to a single work-site (e.g., airport or manufacturing facility) or job-type (e.g., fuel truck operator or boon crane operator).

The server system 103 can comprise one or more server machines 103a and support electronics as are commonly used in the industry to provide remote networking and/or web-serving platforms. For example, suitable arrangements include any number of commercially available server machines, such as a SunServer, Compaq Proliant, or Dell Dimension, running a viable operating system, such as UNIX, Linux, or Windows NT.

The storage media system 104 utilized in embodiments of the present invention are electronically connected to the server system 103, such as by a local area network ("LAN"). Preferably, the storage media system 104 contains one or more databases 104a designed to hold certification results data and related administration information (identifying, for example, the trainees, training centers 106, and/or units 102 from which the data originated). Each database 104a in the storage media system 104 may store its data in any manner known in the art, such as directly on a server hard drive, or remotely on external storage media including tape drives, CD-RWs and writable optical disks, and remote hard drives.

As fully described below with respect to FIGS. 3 and 4, training and certification testing results data are electronically transferred from the individual training units 102 to the central management network 101 for storage after the completion of any training and certification sessions taken by a given trainee. This data can comprise any desirable combination of information deemed relevant to the trainee's/employee's certification status (employee name or ID, certification types, date last certified, scores or performance on tests, number of training sessions taken to pass, pass/fail rates, etc.). Upon receipt by the server system 103 from a given training and certification unit 102, the data is loaded into the appropriate database 104a such that the current certification status of each trainee/employee can be electronically monitored, searched, and sorted by persons being assigned with appropriate administrative access to the data. In this manner, the training and certification responsibilities for a large organization can be more easily administered.

To facilitate the management of the stored results data, the databases 104a in the central management network 101 associate an administrative access profile with all training and certification results data transferred from the training units 102. This administrative access profile defines parameters that determine what persons or entities can obtain electronic access to the results data of a particular trainee/employee, for trainees/employees working at a particular work-site, or for a particular employer entity or organization.

Since standard SQL databases are not directly accessible via the Internet 106, a variety of HTML front-ending tools, such as ASP scripts or CGI scripts, are preferably incorporated within the serving software 105 running on the server machines 103a. Accordingly, these front-ending tools operate as extensions to the server software 105, allowing administrators to request displays of the training and certification results data from remote computers 107 using web browser applications connected to the central management network 101 over the Internet 108. In such preferred embodiments, the server software 105 and its HTML front-ending tools communicate with an appropriate database 104a via SQL or other suitable data access languages to obtain the latest results data whenever requested by an administrator.

Figure 2:
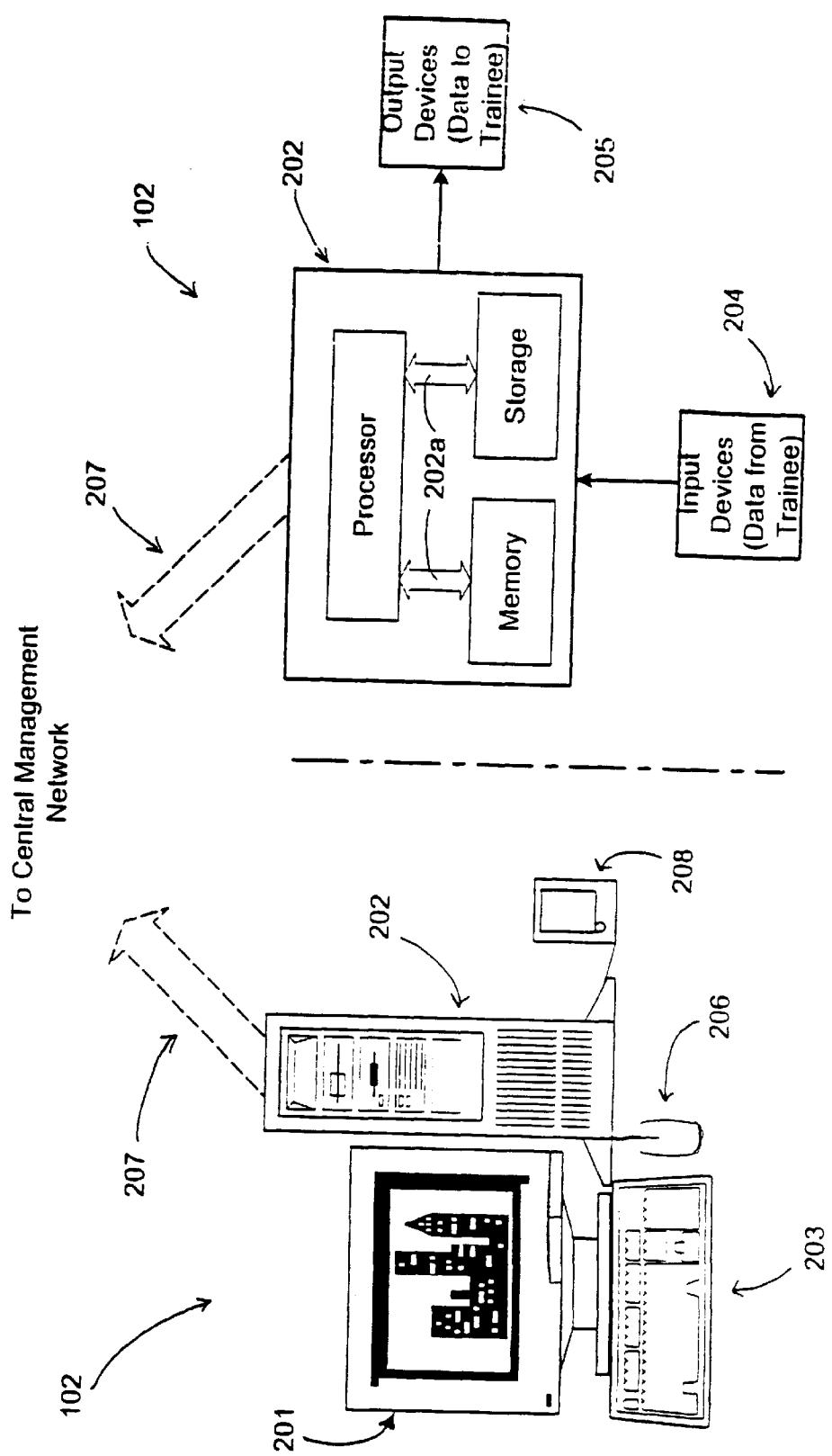
FIG. 2 is a combination pictorial and schematic diagram of a training and certification unit depicting the units interaction with a trainee and the central management network according to embodiments of the present invention.

In FIG. 2 there is presented a combination pictorial and schematic diagram of a training and certification unit 102 according to embodiments of the present invention. Training units 102 according to the invention each include output devices 205 for conveying information to a trainee during a training session, a computer central processing unit 202 for running an interactive training session as described in detail below, and input devices 204 for data entry by a trainee into the CPU 202. In embodiments of the present invention, one or more customized electronic training units 102 are provided to training centers, preferably located at or near the relevant work sites (e.g., manufacturing plants, R&D facilities and airports), to conduct periodic training and certification of its employees. Each such training unit 102 is adapted to provide instruction to employees/trainees on an individual basis, test the employees regarding the instruction, and upload 207 relevant results data pertaining to the training and certification into a searchable database located in the storage media system of the central management network.

As stated above, each training unit according to the present invention interacts with one trainee at a time. As such, it preferably comprises a stand alone turn-key system including a personal computing unit 202 with the training software 202a installed therein. Suitable output devices 205 to provide data to the trainee can include video monitors 201, audio speakers 208, and other means known in the art. Similarly, input devices 204 for obtaining data from a trainee can include a keyboard 203, a mouse 206, and other suitable devices known in the art for interacting with computers using graphical and other user interfaces. Preferably, the output device used for video presentation and the input-device for obtaining data from the trainee jointly comprise a high definition touch-screen monitor whereby the trainee may enter information into the computer by touching appropriate sections of the monitor screen when prompted by training software 202a. In such an embodiment, the need for a keyboard 203, mouse 206 or other input device 204 therefore would be obviated. Additionally., so as to provide a completely self-contained instructional environment for each indivudual trainee, the speakers 208 for ouputting audio content preferably comprise personal headphones.

According to the present invention, instruction is provided in a manner such that the application of concepts being conveyed are applied in an exemplary fashion to the particular trainee's work site (e.g., a particular R&D facility) and/or job type. Preferably, these applied concepts are conveyed using customized multi-media content, such as audio clips, video clips, and audio-visual animations that incorporate images, sounds and strategies specific to the job type at the work site in question. This multi-media content provides highly effective training because it is customized to provide content specifically aimed at the job type and work site for which the trainee requires certification.

In the most preferred embodiments of the present invention, the instructional content on each unit includes high quality digital video files (such as MPEG quality video) stored locally on each training unit's hard drive. These video files are specific to each job type and work site pairing and include video and audio clips and audio-visual animations of the job tasks to be performed within the specific work environment (job site and/or facility). Additionally, computerized animations and simulations can be used in conjunction with or independent of the multi-media video files to provide useful instructional aids such as hypothetical situations and simulations to illustrate the application of various topics. Such multi-media files are incorporated into a seamless testing and training script using suitable multi-media authoring tools, such as Authorware™, a rich media authoring tool made available through Macromedia, Inc. of San Franciso, Calif.

After each section of instruction (series of video clips), the system prompts the user to answer several test questions regarding the previous instruction (video clips). The subject matter and order of these questions, as with the instructional content, are preferably customized for each facility and each type of job certification in the facility. A training session is complete only once the trainee reviews all of the sections of instructional content (such as video clips) and answers the requisite number of test questions.

Figure 3:
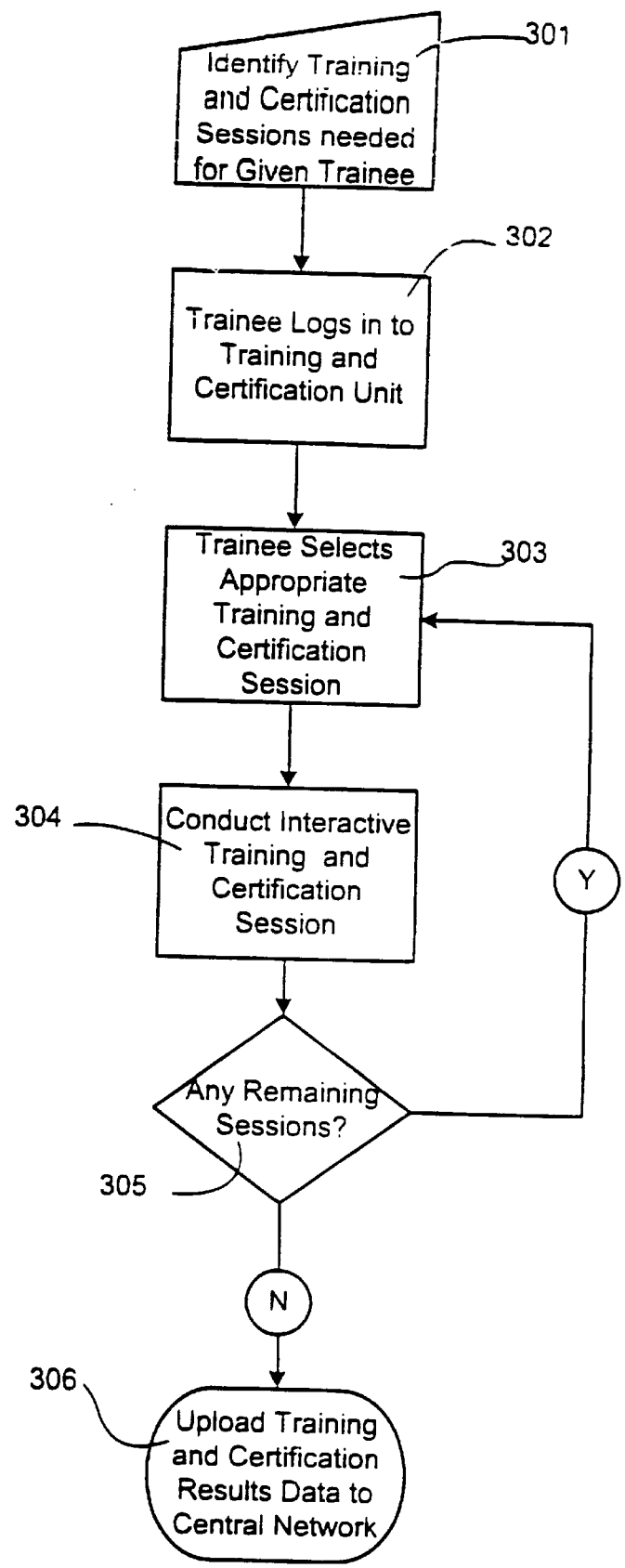
FIG. 3 is a flow diagram depicting the steps whereby a given trainee receives training, and whereby training and certification results data is transferred to the central management network according to embodiments of the present invention.

FIG. 3 is a flow diagram depicting how a given trainee receives training and takes certification tests according to embodiments of the present invention. First, an administrator accesses the central network 101, preferably over the Internet 108, with a remote computer 107 and web browser and identifies 301 what training sessions and certifications are needed by a particular employee (or group of employees). In certain situations, such as the case of a new employee, the administrator could be aware that the central network 101 would not contain any data relating to the new employee and thus could direct the new employee to take the appropriate training and certification session without accessing the central network.

The trainee in question is then logs in 302 to a training and certification unit 102 to take the required training and testing sessions. In the log in step 302, by way of example, the trainee would be prompted to identify himself by entering one or more identifiers (last name, social security number, employer, etc.) before the training unit software 202a would permit access to any customized interactive training and certification content. Optionally, these identifiers could be compared with a master list or roster stored locally on, or made electronically accessible to, each training unit 102 to prevent unauthorized access by persons outside of a particular company or organization as well as to manage what training and certification sessions are taken (as is described in more detail below).

After logging in at step 302, the trainee is prompted to select 303 the appropriate training and certification session that he or she is required to take. Each training unit 102, as described above, is loaded with customized training and certification content (preferably in the form of job specific and site-specific multi-media content such as video files). Each of the units 102 at a given training center 106, however, can be adapted to provide interactive sessions for employees having a plurality of job types and working at a plurality of work sites. By defining various training and certification sessions, a single training unit can be used for various types of employees (e.g., ones that require training for hazardous chemical manufacturing as well as chemical shipping) simply by associating each employee/trainee with a given subset of training sessions.

Optionally, the customized training unit software 202a automatically displays the sessions that are available to or applicable to a particular trainee by comparing the identifiers entered during the log in step with a master list or roster. Thus, while, for example, a particular training center may be utilized by all airline and airport employees that work at a particular airport, the training units' software would provide the logged in trainee with only session selections that were applicable to him or her (e.g., for his airline and his particular job type). Similarly, this same master list approach can be automatically utilized to select appropriate work site content at firm-wide training centers to chose sessions with multi-media content directed to one of several work sites/facilities depending upon the location at which the employee usually works.

After the appropriate session(s) have been selected 303, the training unit begins an interactive training and certification session. FIG. 4 is a flow diagram depicting an exemplary training and certification session wherein site-specific content is incorporated into a sample training script for a particular job-location combination. As shown in the figure, the session typically begins with the outputting of a session introduction at step 401. This introduction typically provides a general summary of what the session training will cover. After the introduction, the interactive software outputs the first section of instructional content. As described above, this instructional content is customized to the particular job type and work site in which the trainee seeks certification. Preferably, the instructional content contains multi-media files in the form of audio clips, video clips, and audio-visual animations of the actual facility or job location at which the trainee will be working. In this manner, the particular nuances and requirements of each facility for compliance with applicable regulations and protocols, can be easily explained and understood by trainees without necessitating further on-site training.

After the trainee has viewed all the instructional content for the first section, the trainee is presented with a test at step 403 to determine how well the trainee has understood and retained the previous section's instructional materials. Typically, these tests comprise a series questions (such as multiple choice, "drag and drop" matching, true or false, fill in the blank, etc.) directed at key concepts covered in the previous section.

In preferred embodiments of the present invention, after the trainee has completed the test for the first section, the interactive program at step 404 checks the trainee's answers to see if a passing score has been obtained on the section. In the event that the trainee has achieved a passing score on the section, the interactive program tabulates the section's results and stores the data in local memory at step 405. Alternatively, of course, processing of the results of each section test could be delayed until after all sections comprising a given section have been completed (thus negating the need for steps 406 through 410). The approach shown in FIG. 4 with individual pass/fail determinations following each section is preferred, however, because it allows for the immediate review by the trainee of any material which was unretained or misunderstood during the initial section instructional step 402.

Figure 4:
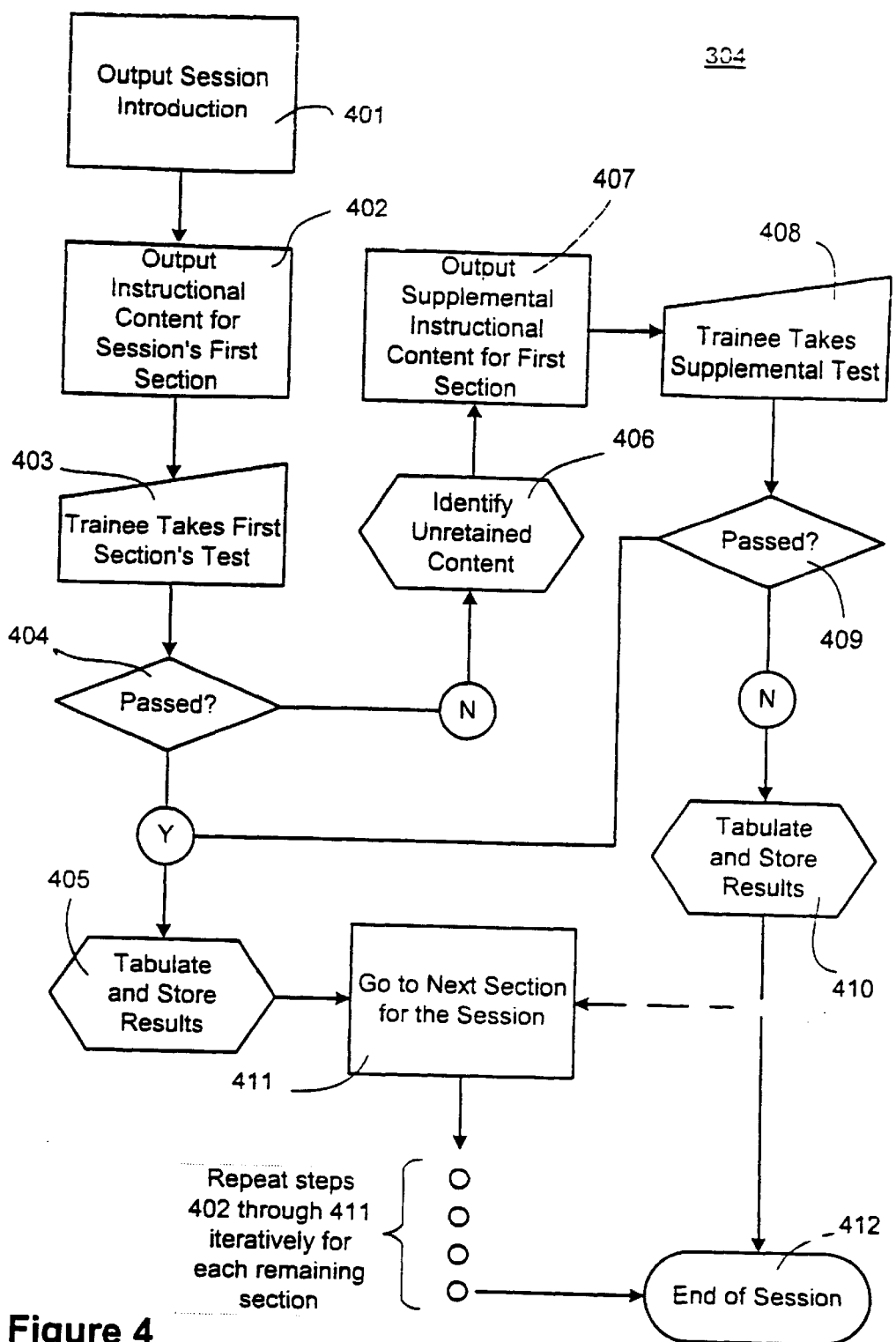
FIG. 4 is a flow diagram depicting steps whereby site-specific multi-media content is incorporated into a training script for training and testing a particular trainee for a session in preferred embodiments of the present invention.

When pass/fail determinations are used after each session, as shown in FIG. 4, when the trainee has failed the test 404, the interactive training software reviews the questions missed by the trainee and identifies 406 any topics or concepts that the trainee did not understand or retain satisfactorily. The software then outputs supplemental material 407 relating to these topics or concepts in an attempt to better educate the trainee on any weak points. These supplemental materials can include either additional instructional content which was not originally shown in step 402 or selected excerpts of content that was shown in step 402 so as to explain any unretained concepts in a different manner or in further detail.

After the trainee has reviewed the supplemental material, the trainee is presented with a supplemental test at step 408. The questions selected for the supplemental test are designed to determine if the trainee has obtained a satisfactory understanding of the materials that were missed in the initial test at step 403.

In the preferred embodiments of the present invention that employ the immediate review and re-testing of failed sections as depicted in FIG. 4, the questions used in the tests at steps 403 and 408 can be generated dynamically as a subset of questions selected from a larger pool of possible questions (e.g., selecting 10 questions out of 50 potential questions). During the first test at step 403, the subset of questions used are selected (in certain embodiments, partially at random) from the pool to provide adequate breadth across all topics. In the supplemental test at step 408 (if necessary) a new subset of questions are selected from the larger pool with the goal of providing adequate depth on the topics and areas in which the trainee performed poorly in the initial test. Alternatively, of course, the same questions can be used for each trainee on one or all sections of a given session.

Furthermore, in preferred embodiments, the order of the multiple choice answers for any particular question can be randomly shuffled such that the answer doesn't always appear on the same portion of the touch screen. This process of selecting questions from a larger pool such that subsequent trainees are not given identical tests and shuffling answers such that identical questions do not necessarily have the same answer locations, helps ensure that certification results are less likely to become compromised.

After the trainee has completed the supplemental test for the first section, the interactive program at step 409 checks the trainee's answers to see if a passing score has been obtained on the section. In the event that the trainee has achieved a passing score on the section, the interactive program tabulates the section's results and stores the data in local memory at step 405. If the trainee has not passed the supplemental test for the section, the interactive program tabulates 410 the section's results for both the initial test (step 403) and the supplemental test (step 408) and stores the data in local memory.

Depending upon how the session is structured, a failure of a particular section could constitute the failure of an entire session. In cases wherein a section failure is deemed to preclude a trainee from receiving a certifying score for the entire training session, after tabulating the unsuccessful test results at step 410, the session could end 412 without the trainee having to view subsequent sections. In embodiments of the invention wherein a single section failure does not preclude certification (represented by the dashed line routing step 410 to step 411), the automated training software would proceed to the next section 411 for the session. Similarly, a trainee who passed either the initial first section test or the first section's supplemental test would, after having their successful results tabulated and stored at step 405, proceed to the next section for the session 411. For each subsequent section, steps 402 through 411 would be repeated until the end of the session 412 is reached.

Referring back to FIG. 3, after a session has ended, the interactive training and certification software queries to determine whether the trainee has completed all the sessions selected at step 303 (if more than one such session were selected). If there are remaining sessions, the software returns to step 303 and the trainee is given the option to select a next session and then repeat the training and certification step 304. If no additional sessions remain at 305, then interaction with the trainee is ended. Pertinent training and certification results data is thereafter uploaded 306 to the central management network for storage in the appropriate database.

As will be readily appreciated by one of ordinary skill in the art, many alternative mechanisms may be employed to transfer the results data for training and certification sessions to the central management network. Preferably, each training unit within each training center is equipped with an electronic communications link 109 (as shown in FIG. 1) that connects it to the central management network. For example, periodically (e.g., once a day or after each trainee) each training unit could use a dedicated electronic line (such as an ISDN or T1 line) as its communications link 109 to connect to the Internet 108 (such as via a proxy server or via a firewall for protection) and communicate the results data to the server system of the central management network. In this manner, results data can be sent by known online protocols such as TCP/IP or FTP. Similarly, results data can be sent as file attachments to or within the body of email messages that are addressed to the server system of the central management network. Alternatively, the communications link 109 of each training unit could comprise a modem and telephone line which can be periodically used by the training units to dial in directly to a server on the central management network, or to connect to an Internet service provider ("ISP"), and then transfer the results data in a suitable manner.

In embodiments of the present invention, this communications link 109 can comprise an electronic connection 109' through an administrative computer 110 (as shown in FIG. 1) such that the administrative computer 110 performs the task of periodically transferring new results data to the central management network 101 (such as via the Internet 108). Using this arrangement, the administrative computer can be used to archive a local copy (including storing on a local hard disk or a floppy disk, or making a hard copy print-out) of the training and certification results data as well as remove the training units 102 from direct exposure to the Internet or the central management network. Additionally, such archival copies of the training and certification results data can be stored locally on each individual training unit.

Those skilled in the art will also readily appreciate that various customization techniques can be employed to each training and certification session. In addition to the customized multi-media files containing information specific to a particular facilities and job types, further parameters that can be changed to achieve customization include the types of questions used in testing, the relative order of sections, and the scoring methodologies used for determining whether a trainee should be certified. For example, a passing score for a training and certification session could be based on getting a percentage of questions correct for all sections, a minimum number of questions correct for each section, or upon passing a requisite number of sections.

Figure 5A:
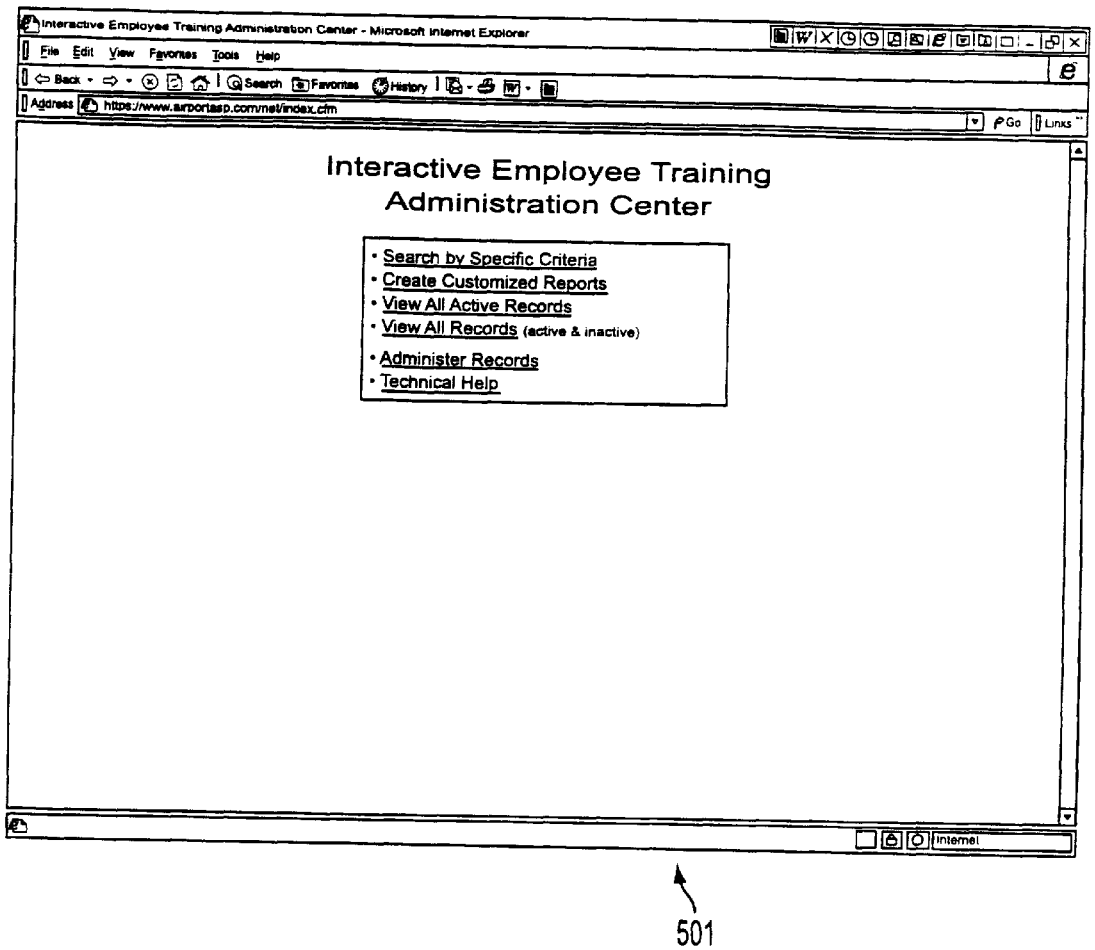
FIGS. 5a through 5e depict the Internet interface as seen with a web browser whereby training and certification administrators may remotely access trainee information stored within the central management network according to preferred embodiments of the present invention.

FIGS. 5a through 5e depict the Internet interface as seen with a web browser whereby training and certification administrators may remotely access trainee information and results data stored within the central management network according to preferred embodiments of the present invention. As shown in FIG. 5a, after an administrator has logged in to the site via the Internet (the site using passwords and security protocols as is known in the art), a menu web page 501 is provided that offers a series of tools for use by the administrator. These tools include: a utility for performing searches according to predefined criteria, a utility for creating customized certification status reports, a utility for viewing all active or all active and inactive records (to which the administrator has access), a utility allowing the administrator to manage the records, and a help utility.

Figure 5B:
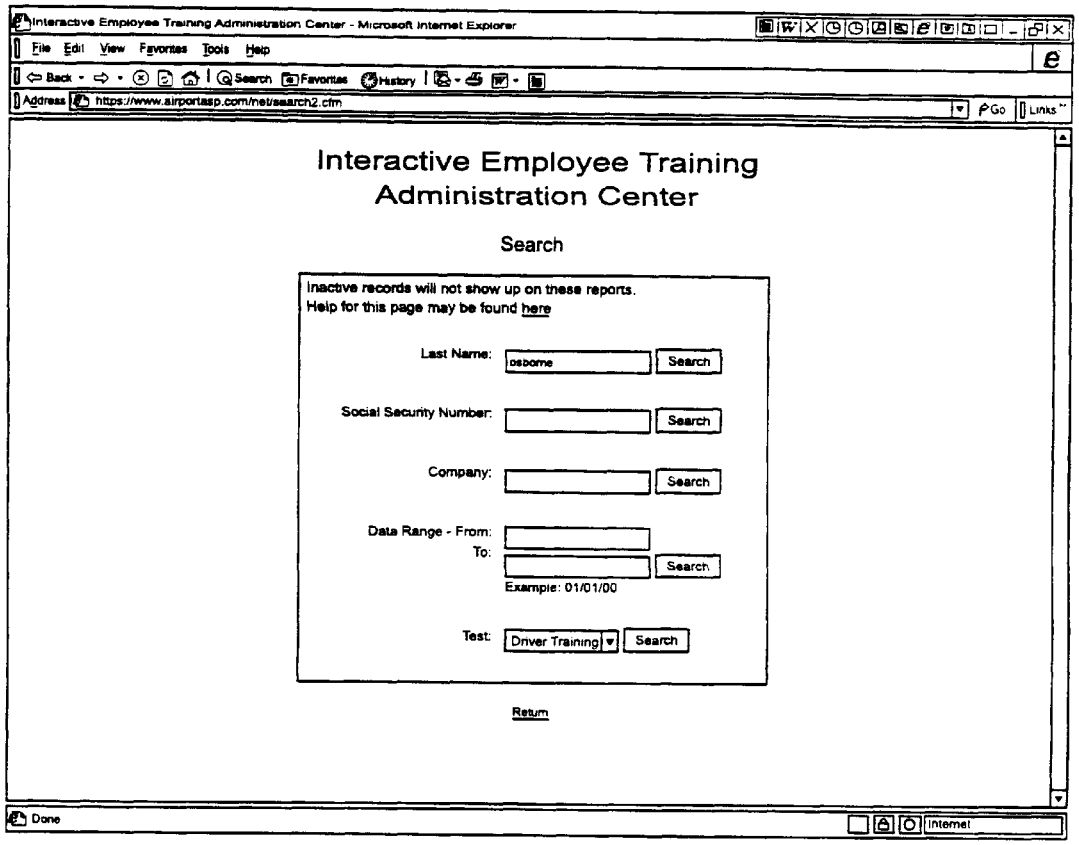
Figure 5C:
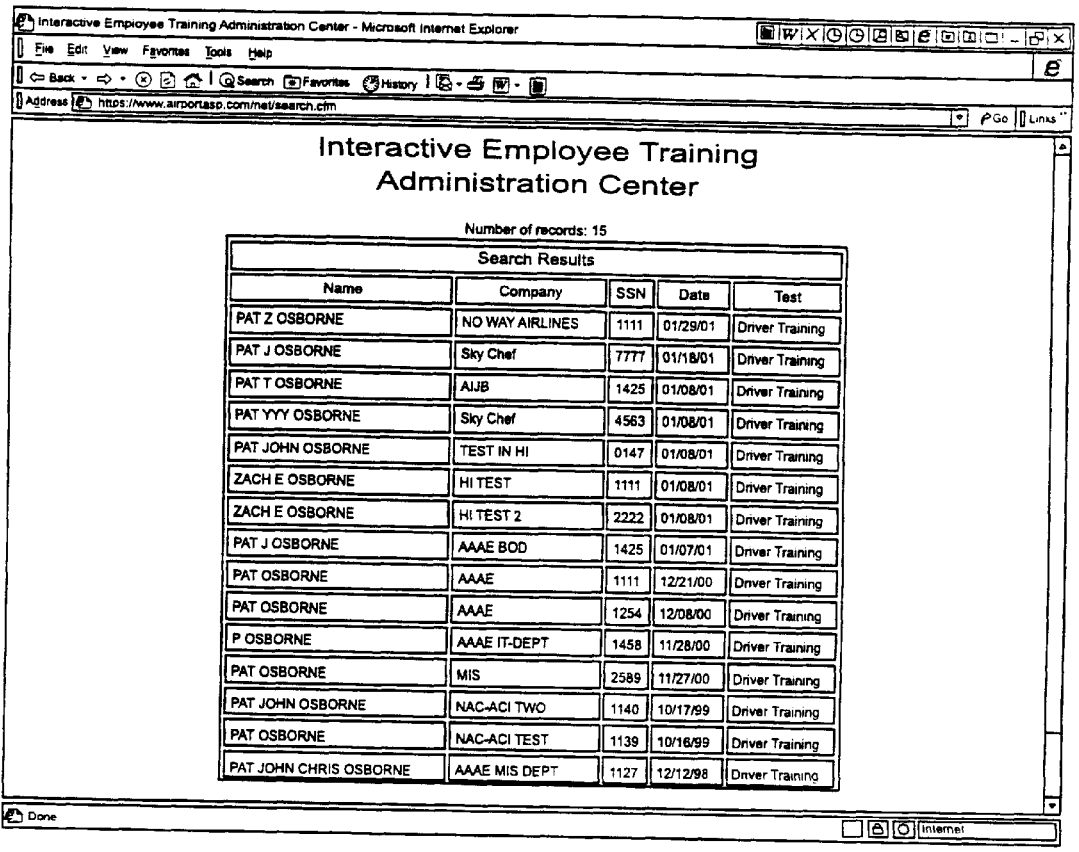

FIG. 5b shows the web page 502 that would be encountered when an administrator chooses the record searching utility on web page 501. This utility would allow the administrator to locate and view records according to search terms in relevant fields, including: the last name of the trainee, a trainee identification number (such as a social security number), the trainee's company or organization, a date range for when the training and certification session occurred, and the type of test (i.e., job type or work site). As shown in FIG. 5b, initiating a search from web page 502 using the last name "Osborne" and the test type "driver training" would cause the selection and display of all results data to which the administrator has access privileges that satisfy those search terms. Web page 503 depicted by FIG. 5c provides an example of the type and format of results that can be obtained from such a query.

Figure 5D:
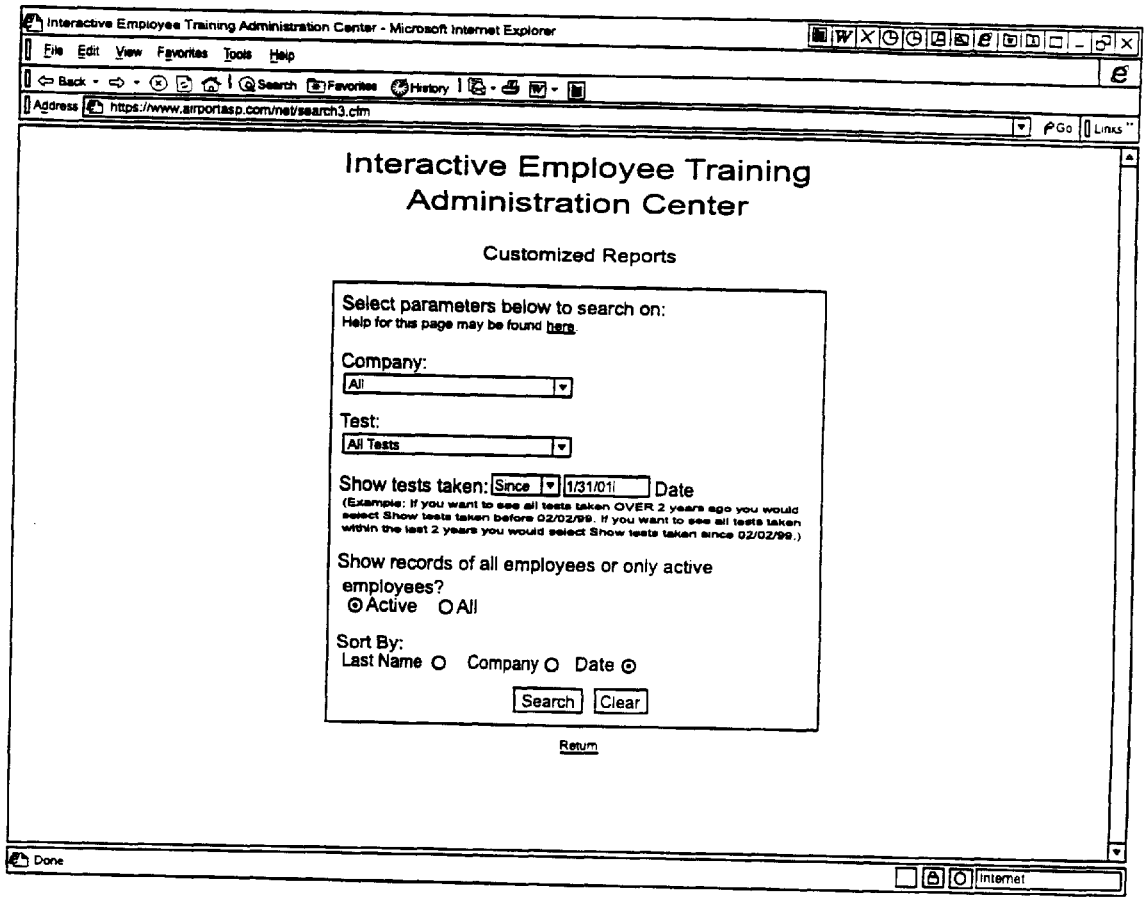
Figure 5E:
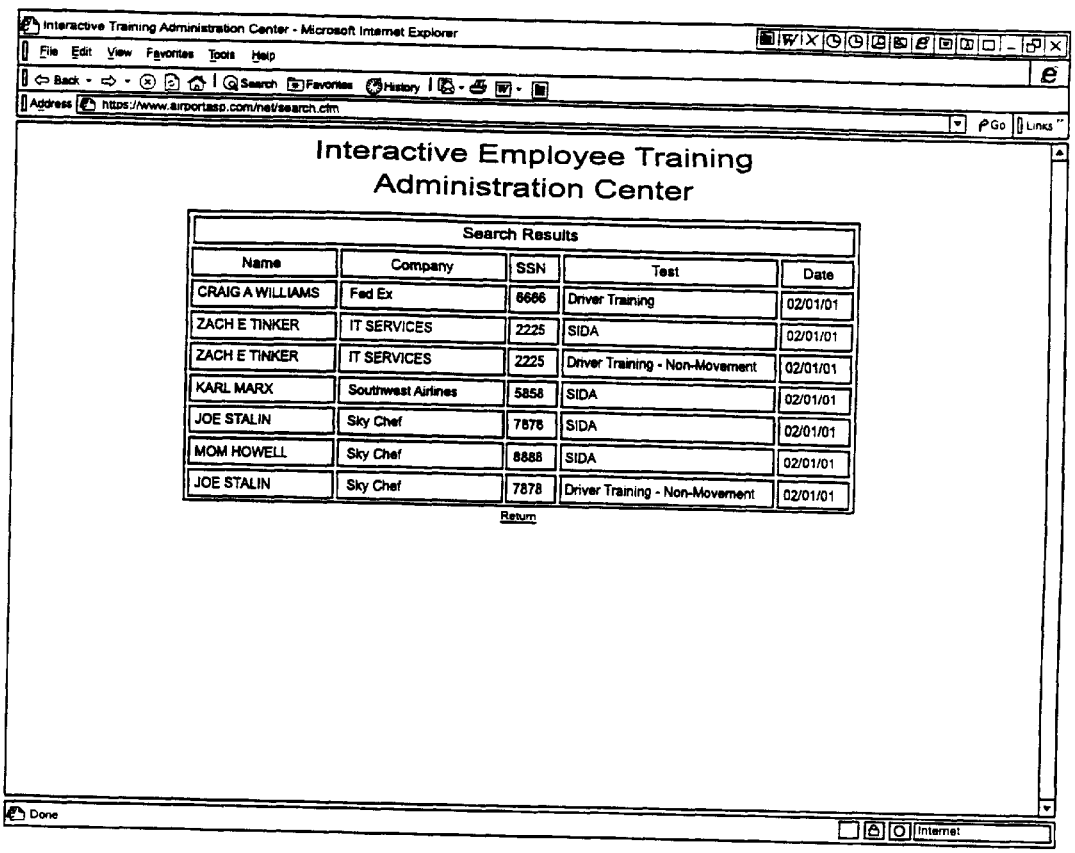

Similarly, FIG. 5d depicts a web page 504 that would be encountered if an administrator selected the custom report utility offered on web page 501. By manipulating the illustrated query fields in a manner as is known in the art, a special report web page 505 shown in FIG. 5e can be obtained. These reports can then be downloaded or printed using standard web browsing software functionality.

Various modifications of the embodiments herein disclosed will be readily apparent to one skilled in the art after reading the above. Any and all such modifications are intended to be covered by the application as claimed.

What is claimed is:

1. A method for electronically educating trainees, comprising:

compiling computerized training materials having multi-media training content, said multi-media training content being compiled into one or more courses specifically customized for various combinations of activity sites and activity types, said multi-media content in each said course being customized for each said combination of activity sites and activity types by containing video files having instructional images of said determined activity type being properly performed at said determined activity site;

determining an activity type associated with each trainee;

determining an activity site associated with said each trainee and said determined activity type; and providing to each particular trainee multi-media training from an appropriate compiled course based on said determined activity types and said determined activity sites wherein said provided multi-media training has multi-media content specifically customized to provide for each said trainee instruction depicting video of said determined activity type being properly performed at said determined activity site, said multi-media training being performed with a computing device operating software that incorporates said multi-media content.

2. The method according to claim 1, further comprising administering testing designed to identify whether a predetermined portion of said multi-media training has been understood by each said particular trainee, said administering of testing comprising:

receiving answers from each said particular trainee in response to said testing; and generating data in response to said received answers, said data being representative of a degree to which said answers evidence a proper understanding of said multi-media training.

3. The method according to claim 2, further comprising after receiving said user input in response to said testing:

evaluating whether said data evidences that said answers satisfy a predetermined certification criteria;

whenever said predetermined certification criteria is not satisfied, providing supplemental multi-media training based on said determined activity type and said determined activity site, and, following said supplemental multi-media training, providing supplemental testing to determine whether said supplemental multi-media training has been understood; and transmitting a certification result to a certification data store depending upon results of said training and said supplemental training.

4. The method according to claim 3, wherein said supplemental multi-media training is specifically adapted to provide additional training regarding subjects determined to be not understood from said input in response to said testing.

5. The method according to claim 2, wherein said testing designed to identify whether a predetermined portion of said multi-media training has been understood is integrated with said multi-media content so as to be interspersed among video files relevant to topics of said testing.

6. The method according to claim 1, wherein each said trainee is an employee having a job and said activity type is a work task associated with each said employee's job, and wherein said activity site is a facility at which each said employee is to perform said task.

7. The method according to claim 6, wherein said multi-media content comprises video files having images of said facility.

8. An integrated method of training and certifying one or more individuals based on relevant activity types and relevant activity sites associated with said individuals, said method comprising:

compiling computerized training materials having multi-media training content, said multi-media training content being compiled into one or more courses specifically customized for various combinations of activity sites and activity types, said multi-media content in each said course being customized for each said combination of activity sites and activity types by containing video files having instructional images of said determined activity type being properly performed at said determined activity site;

determining an activity type for each individual;

determining an activity site associated with each said determined activity type for each said individual;

providing to each said individual multi-media training, customized to said determined activity type and said determined associated activity site wherein said provided multi-media training has multi-media content specifically customized to provide instruction to each said individual depicting video of said determined activity type being properly performed at said determined associated activity site, said multi-media training being performed with a computing device operating software that incorporates said multi-media content;

providing a certification interface configured to receive user input from each said individual in response to testing inquiries administered in conjunction with said provided multi-media training; and transmitting results data evidencing a relative level of success for each said individual to a central storage medium based upon results of any testing performed in conjunction with delivered training.

9. The method according to claim 8, further comprising after receiving said user input relating to said testing and before transmitting said results data:

evaluating whether said received user input satisfies a predetermined criteria; when the predetermined criteria is not satisfied, providing supplemental multi-media training based on the determined activity type and the determined activity site, and providing a certification interface configured to receive user input relating to supplemental testing; and wherein said relative level of success is based upon results of said inputs relating to said testing and said supplemental testing.

10. The method according to claim 8, wherein said determining steps are performed automatically by software that cross-checks identifiers of said individuals with a master roster.

11. The method according to claim 8, wherein said testing is designed to identify whether a predetermined portion of said multi-media training has been understood, and wherein said testing is integrated and interspersed within said multi-media content.

12. The method according to claim 8, wherein said determined activity type is a job, each said individual is an employee who needs to be trained and certified to perform said job, and said determined activity site is a location at which said employee needs to be certified to perform said job.

13. A system for managing training and certification information pertaining to a plurality of individuals, each individual being associated with a need to have training and certification for a combination of an activity type to be performed at an associated activity site, said system comprising:

a centralized data store configured to receive, store and transmit training and certification data;

server software in communication with said centralized data store and designed to enforce rules relating to the receipt, storage, and transmission of training and certification data;

a plurality of training units configured to provide multi-media training to said plurality of individuals and thereby generate said training and certification data, said plurality of training units also being configured to transmit said generated training and certification data with respect to said individuals to said centralized data store, wherein said training units contain computerized training materials having multi-media training content, said multi-media training content being compiled into one or more courses specifically customized for various pairs of activity sites and activity types associated with said plurality of individuals, each said course being specifically customized for a particular pair defined by one of said activity types and one of said activity sites associated with said one activity type, said multi-media content in each said course being customized for each said pair by containing video files having instructional images of said one activity type being properly performed at said one activity site, and wherein said training units provide said multi-media training to each said individual customized to a determined activity type and a determined activity site associated with that individual by selecting and providing an appropriate one of said courses that depicts video where said pair corresponds to said determined activity type and said determined activity site;

a plurality of network clients configured to receive training and certification data from said data store via said server software, said clients being operable upon direction of one or more training and certification data administrators;

a set of network connections providing connectivity between the centralized data store and the plurality of training units, and providing connectivity between the centralized data store and a plurality of network clients.

14. The system according to claim 13, wherein said training units are individual turnkey computing devices containing training and testing software thereon, said training and testing software being adapted to provide said computerized training materials having multi-media training content to a given individual and then test that said given individual regarding said training materials to determine whether that said given individual exhibits a minimum certification level understanding of said training materials.

15. The system according to claim 13, wherein said training units comprise a video display device, audio speakers, and input means.

16. The system according to claim 15, wherein said video display means and said input means together comprise a touch-screen video monitor, and wherein said audio speakers comprise earphones.

17. The system according to claim 13, wherein said centralized data store is electronically accessible by a certification administrator via said network clients so as to facilitate the identification of individuals requiring certification.

18. The system according to claim 13, wherein said plurality of network clients are adapted to enable authorized persons to access said training and certification data in said data store remotely, said access allowing said authorized persons to determine a certification status for a given individual relating to a particular activity type and activity site pair.

19. A turnkey system for training and certifying an individual for an associated relevant activity type to be performed at an associated facility, said turnkey system comprising:

a touch screen monitor;

a computing device comprising a central processing unit and a storage device, said computing device being connected to said touch screen monitor and said auditory output device and being configured to identify said activity type and said associated facility from said individual and thereafter provide instruction customized to said determined activity type and said determined associated facility with multi-media content, said multi-media content being present on said storage device as one or more electronic courses specifically customized for various combinations of one or more possible activity sites and one or more possible associated facilities, said multi-media content in each said course being customized for each said pair of activity sites and facilities by each course containing video files having instructional images of one said possible activity type being properly performed at one said possible facility; and said customized instruction being provided by said processing unit identifying and delivering an appropriate one of said courses that depicts video where said pair corresponds to said determined activity type and said determined associated facility.

20. The system according to claim 19, further comprising a network communication device in electronic communication with said computing device, wherein said computing device uses said communication device to transmit data regarding certification results for a trainee after a completed training session.

* * * * *